(12) United States Patent
Mendizabal et al.

(10) Patent No.: US 7,249,089 B2
(45) Date of Patent: Jul. 24, 2007

(54) METHOD AND SYSTEM FOR AUCTIONING BANKRUPTCY ASSETS AND VALUING SAME

(75) Inventors: Lorenzo Mendizabal, Bloomfield, CT (US); William R. Gruber, Jr., Loveland, OH (US); Francine Gordon, Aurora, OH (US); David Marchick, Chevy Chase, MD (US); Ricardo Perez, San Mateo, CA (US); Donald Pierce, Enfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 283 days.

(21) Appl. No.: 10/034,151

(22) Filed: Dec. 27, 2001

(65) Prior Publication Data

US 2002/0128956 A1    Sep. 12, 2002

(51) Int. Cl.
    *G06Q 40/00* (2006.01)
(52) U.S. Cl. ...................................................... 705/37
(58) Field of Classification Search .................. 705/37, 705/35
    See application file for complete search history.

(56) References Cited

U.S. PATENT DOCUMENTS

| | | | |
|---|---|---|---|
| 5,802,501 A * | 9/1998 | Graff ............................ | 705/36 |
| 5,857,174 A * | 1/1999 | Dugan ........................... | 705/1 |
| 5,911,131 A * | 6/1999 | Vig ............................... | 705/1 |
| 6,021,398 A * | 2/2000 | Ausubel ........................ | 705/37 |
| 6,393,406 B1 * | 5/2002 | Eder .............................. | 705/7 |
| 6,411,936 B1 * | 6/2002 | Sanders ......................... | 705/10 |
| 6,415,270 B1 * | 7/2002 | Rackson et al. ............... | 705/37 |
| 6,449,601 B1 * | 9/2002 | Friedland et al. ............. | 705/37 |
| 6,453,303 B1 * | 9/2002 | Li ............................. | 705/36 R |
| 6,718,312 B1 * | 4/2004 | McAfee et al. ................ | 705/37 |
| 2002/0099637 A1 * | 7/2002 | Wilkinson et al. ............ | 705/36 |
| 2003/0061150 A1 * | 3/2003 | Kocher .......................... | 705/37 |
| 2003/0097282 A1 * | 5/2003 | Guse et al. ..................... | 705/4 |
| 2003/0220867 A1 * | 11/2003 | Goodwin et al. ............. | 705/37 |
| 2006/0184443 A1 * | 8/2006 | Erez et al. ..................... | 705/37 |
| 2006/0229973 A1 * | 10/2006 | Sternberg ..................... | 705/37 |

OTHER PUBLICATIONS

Preston Gralla, How The Internet Works, 1999, pp. 41-43, 126-133, and 162-165.*

(Continued)

*Primary Examiner*—Ronald Laneau
(74) *Attorney, Agent, or Firm*—Plevy, Howard & Darcy, PC

(57) ABSTRACT

A method and system for conducting, managing and executing over a communication network, an auction of at least one claim or asset in bankruptcy to a plurality of buyers having expressed interest purchasing bankruptcy claims or assets is presented. The method includes placing an indication of the availability of at least one of said assets at a remote site, such as a website, wherein said indication is accessible by each of said plurality of buyers over said network, notifying at least one buyer predeterminedly expressing interest in items contained within said claims or assets of the availability of said at least one claim or asset, determining a market value of said at least one claim or asset based on historical data of same or similar claims or assets, dynamically adjusting the market value based on known factors, conducting an interactive bidding process, notifying one of the bidding buyers of acceptance of a corresponding bid when said bid satisfies predetermined criteria, and recording the accepted bid.

19 Claims, 8 Drawing Sheets

OTHER PUBLICATIONS

Warren E. Agin, Using Internet Auctions to Sell Bankruptcy Estate Assets, The Cyberspace Lawyer, vol. 4, No. 6, Oct. 1999.*

Robert F. Reilly, What Accountants Need to Know About the Bankruptcy Valuation Process, Ohio CPA Journal, vol. 51, No. 3, Jun. 1992, pp. 13-20.*

David Gray Carlson, Undersecured Claims Under Bankruptcy Code Sections 506(a) and 1111(b): Second Looks at Judicial Valuations of Collateral, 6 Bank. Dev. J. 253, 1989.*

Elliott D. Levin and Phyllis McGurk, Who Gets the Goodies: What Happens to the Enhancements of the Secured Parties; Collateral Post-Petition?, Commercial Law Journal, vol. 102, Issue 1, Spring 1997, pp. 55-93.*

Kenneth Wieand, et al., Are Real Assets Priced Internationally? Evidence from the Art Market, Multinational Finance Journal, vol. 2, No. 3, Sep. 1998, pp. 167-187.*

U.S. Appl. No. 60/152,473.*

* cited by examiner

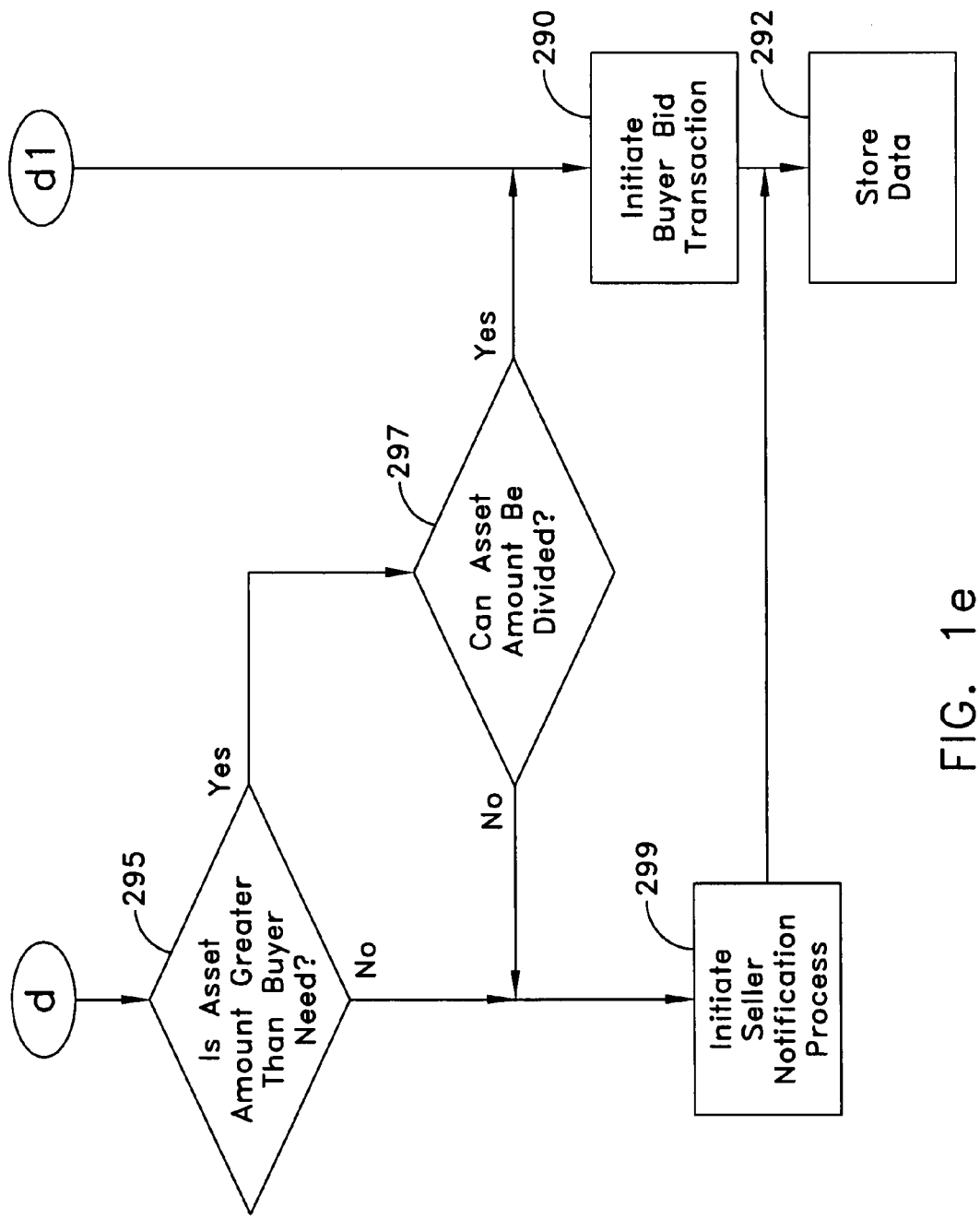

METHOD AND SYSTEM FOR AUCTIONING BANKRUPTCY ASSETS AND VALUING SAME

RELATED APPLICATIONS

The application is related to and claims the benefit of the filing date, pursuant to 35 U.S.C. §119, of commonly assigned provisional patent application Ser. No. 60/259,263 entitled "Method and Computerized System for Buying, Selling and Auctioning of Bankruptcy Claims and Other Choses In Action" filed on Dec. 29, 2000, which is incorporated by reference herein.

FIELD OF THE INVENTION

This invention is related to auction methods and systems, more specifically to a process for automating, managing, valuing and executing auctions of assets in bankruptcy.

BACKGROUND OF THE INVENTION

It is believed that the market size of bankruptcy claims trading is approximately $25 billion per year. However, bankruptcy claims trading is known and performed by a relatively small number of sophisticated buyers that understand and follow bankruptcy filings. A conventional bankruptcy process involving one or more buyers monitoring cases filed in the U.S. Bankruptcy Court, in which the buyer has expressed an interest. The buyer may then contact the sellers of the asset(s) of the bankrupt organization at key information points. The buyer and seller may negotiate a price for the assets or a bankruptcy trustee may order a sale of the assets, for example, through an auction, to obtain the highest price a buyer may be willing to pay.

Depending on the sophistication of seller and their credit exposure, there is often little or no information regarding a fair market price of the bankruptcy asset(s). Similarly, there is no established method for a buyer to determine a fair market price of the bankruptcy assets. Difficulty in determining a fair market value for claims and a limited trading community further hinders the auction process. Hence, in an auction of bankruptcy assets a seller may not know whether the value received is too low and, correspondingly, a buyer may not know whether the price paid is too high.

Hence, there is a need for a method and system that creates an effective environment for trading in the sale of bankruptcy assets which can also determine a valuation of bankruptcy assets based on previous or similar sales and/or transactions.

SUMMARY OF THE INVENTION

A method and system for conducting, managing and executing over a communication network, an auction of at least one claim or asset in bankruptcy to a plurality of buyers having expressed interest in items contained within the claims or assets, is disclosed. The auction method comprises, placing an indication of the availability of at least one of the assets at a remote location on the network wherein the indication is accessible by each of the plurality of buyers over the network, notifying at least one of the plurality of buyers predeterminedly expressing interest in items contained within the claims or assets of the availability of the at least one claim or asset, determining a market value of the at least one claim or asset based on historical data of same or similar claims or assets, dynamically adjusting the market value based on known factors, receiving bids from at least one of the responding buyers, notifying one of said at least one bidding buyers of acceptance of a corresponding bid when the bid satisfies predetermined criteria and recording said accepted bid.

BRIEF DESCRIPTION OF THE FIGURES

The advantages, and nature, and various additional features of the invention will appear more fully upon consideration of the illustrated embodiments now to be described in detail in connection with accompanying:

FIGS. 1a–1e collectively illustrate a block diagram of an exemplary bankruptcy auction process in accordance with the principles of the present invention;

Figure 1A:
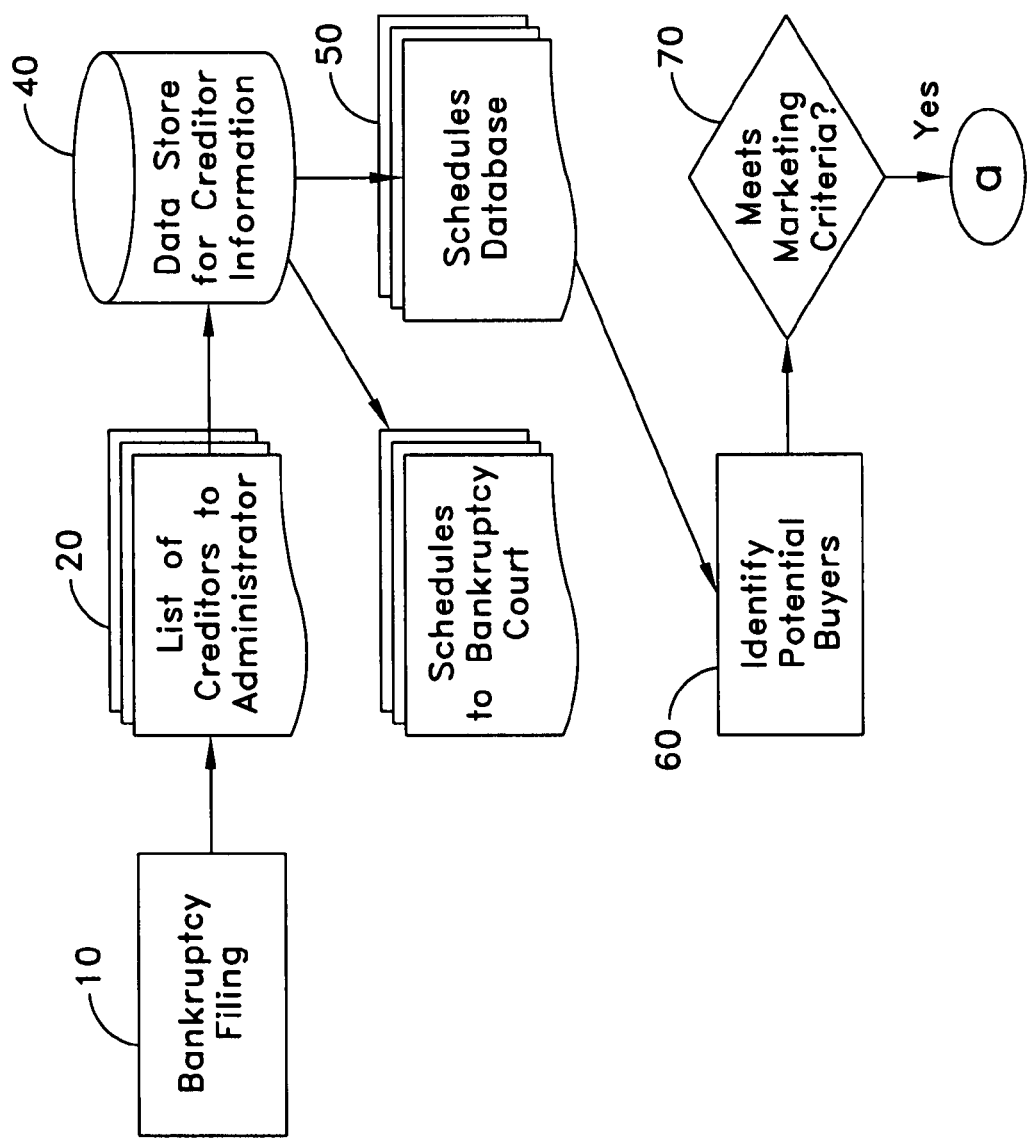

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DESCRIPTION OF THE PREFERRED EMBODIMENT

FIGS. 1a–1e collectively illustrate a bankruptcy auction process, as viewed from the perspective of a buyer, for trading of bankruptcy assets in accordance with one aspect of the invention. Although, not shown or discussed in detail, it would be understood that a process, as viewed from the perspective of the seller, may similarly be initiated in accordance with the principles of the invention. Hence, a process of valuing and auctioning assets as viewed by a seller is contemplated to be within the scope of the invention.

FIG. 1a illustrates an exemplary bankruptcy filing processing in accordance with principles of the present invention. In this illustrative process, upon a bankruptcy filing 10, a list of creditors 20 (i.e., creditor schedule) is supplied to a bankruptcy court. Creditor schedules may be obtained directly through the court from a claim administrator, either as hard copy or electronically. The data contained within creditor list 20 is then stored in a data store for creditor information 40. Data store 40 may be a database or similar data collection device, which may be used to identify and store information regarding creditors. A subset of the data within creditor list 20 stored in the data store 40 is generated using filtering to populate a schedules database 50 that is used to analyze financial and market data to potential buyers and determine likely timing of amounts of distribution.

Identification of potential buyers 60 is then made based on factors, such as previous purchasing behavior, industry links, buyer predetermined preferences, market research, etc. Buying preferences, as stored in database 50, of each potential buyer 60 is then matched against select marketing criteria 70. Although the illustrative example discusses the use of database 50 for determining corresponding preferences of potential buyers, it would be appreciated that list of potential buyers 60 may also be matched against preference data store in database 40.

Figure 1B:
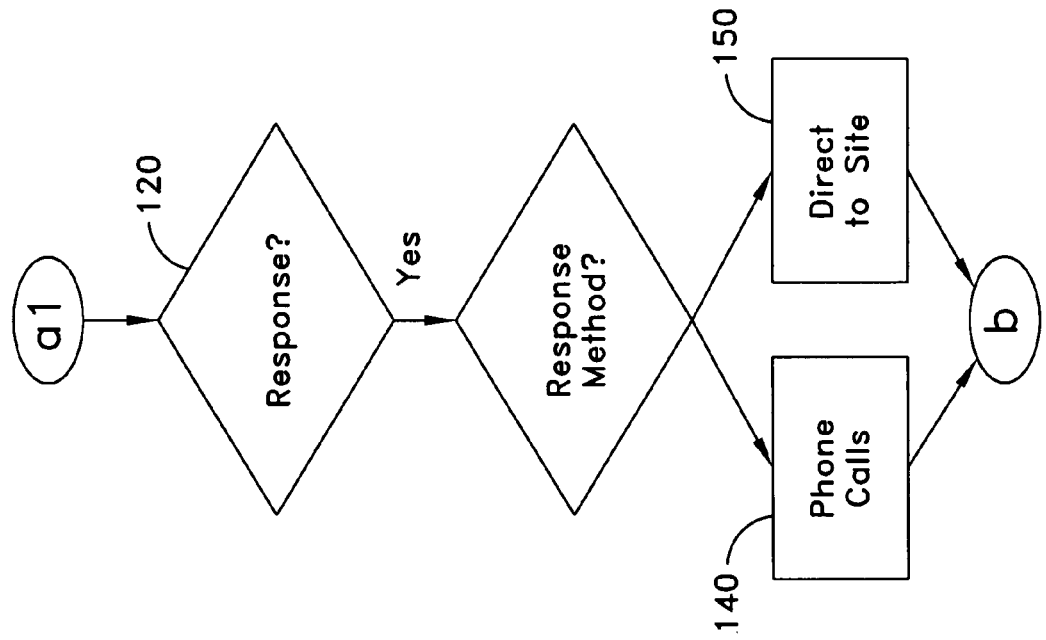
Figure 1B:
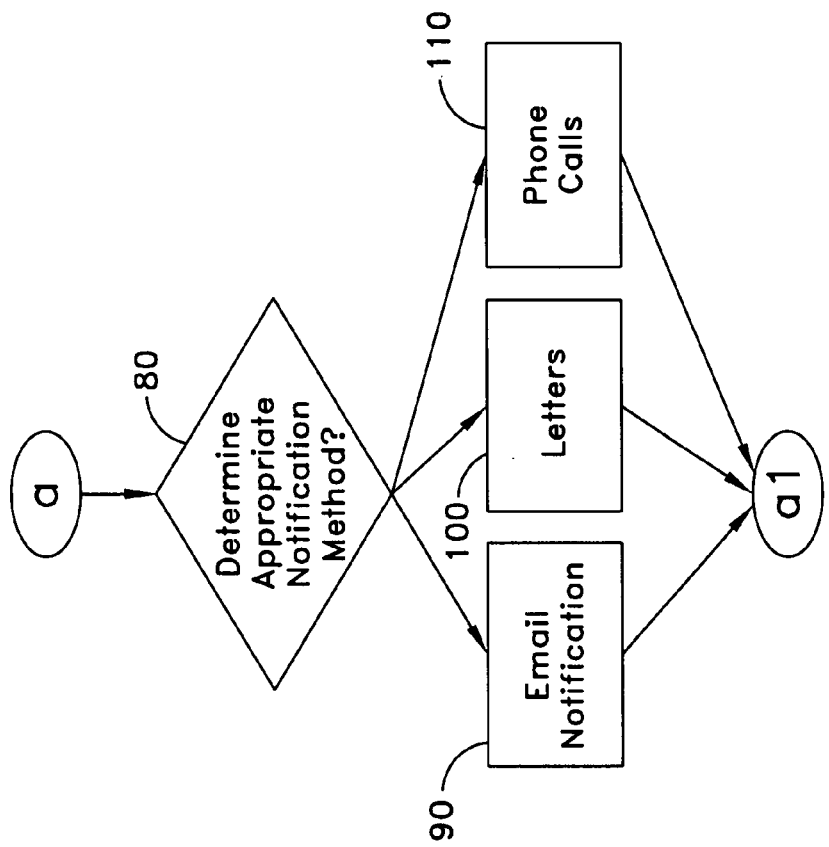

FIG. 1b is representative of a continuation of an exemplary bankruptcy asset auction process in accordance with the principles of the present invention. In this illustrative continuation of the asset auction process, at block 80 an appropriate notification method for each of the potential buyers meeting or matching criteria 70 is made. The notification method may be determined in accordance with, and responsive to, buyer predetermined or preferred methods or settings, which may be stored on data store 40 or schedule database 50. For example, buyers may pre-store preferred methods of notifications such as the illustrated e-mail notification 90, letter 100 or phone call 110. However, it would be appreciated that other notification methods may be utilized and are contemplated. A response from a notified matched buyer is then awaited at block 120. Responses may be in the form of a return phone call 140 or direct to site 150 such as communication over a network, e.g., Internet. A list of each responding buyer is then maintained.

Figure 1C:
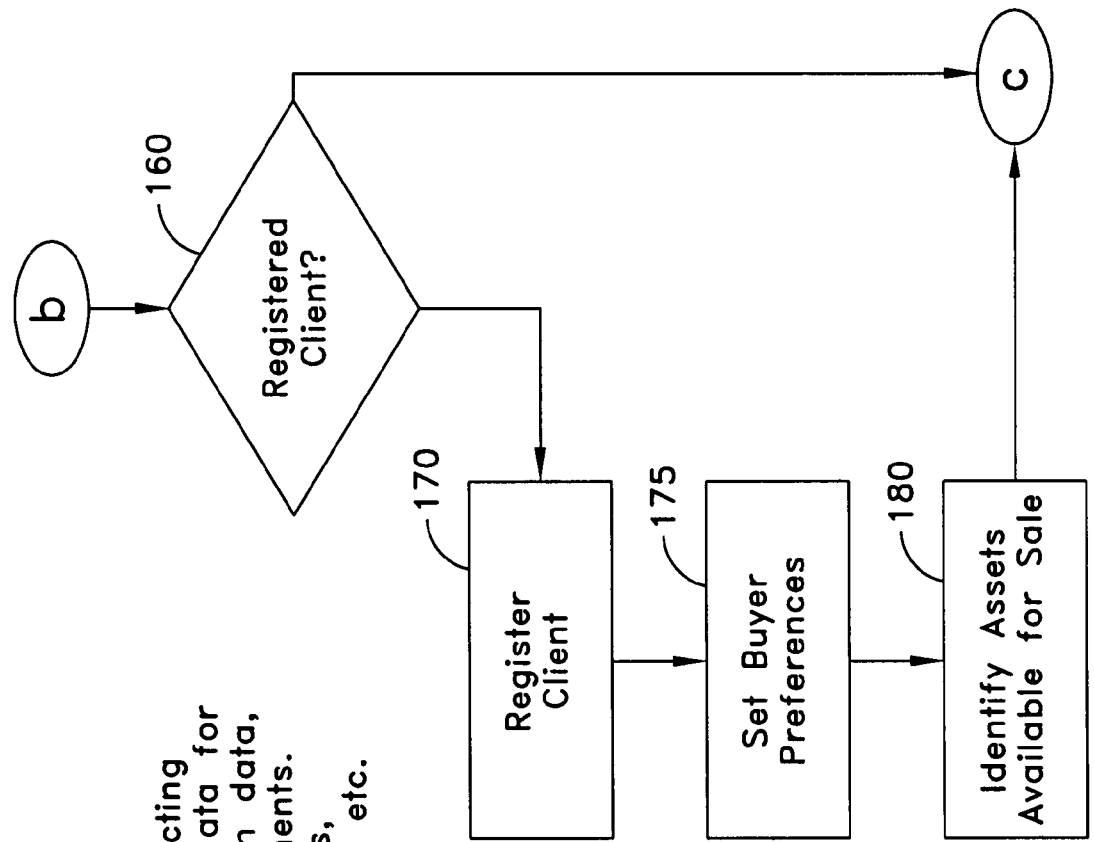

FIG. 1c is representative of a continuation of an exemplary bankruptcy auction process in accordance with the principles of the present invention after a buyer response is received. At block 160, a determination is made whether the responding buyer is a registered client or member. If the respondent is not a registered client or member, then a request is made at block 170 for the buyer to register. Registration processes are well known in the art and need not be discussed in detail herein. After registration, a buyer may, at block 180, establish preferences regarding, for example, the types of assets, claim amounts, bid limits, etc., that the buyer has an interest. A registered buyer client or member may also predeterminedly establish methods of notification. The buyer's predetermined or preferred interests and notification method may then be used to inform a registered client or member of subsequent auctions having similar assets. Assets within database 50 (and/or data store 40) may then be identified, at block 180, using an identification number, for example, using corresponding to the buyer's preference 175. Although FIG. 1c represents a preferred embodiment, it would be appreciated that the process disclosed is not limited to only registered client or member buyers but may include unregistered buyers also.

Figure 1D:
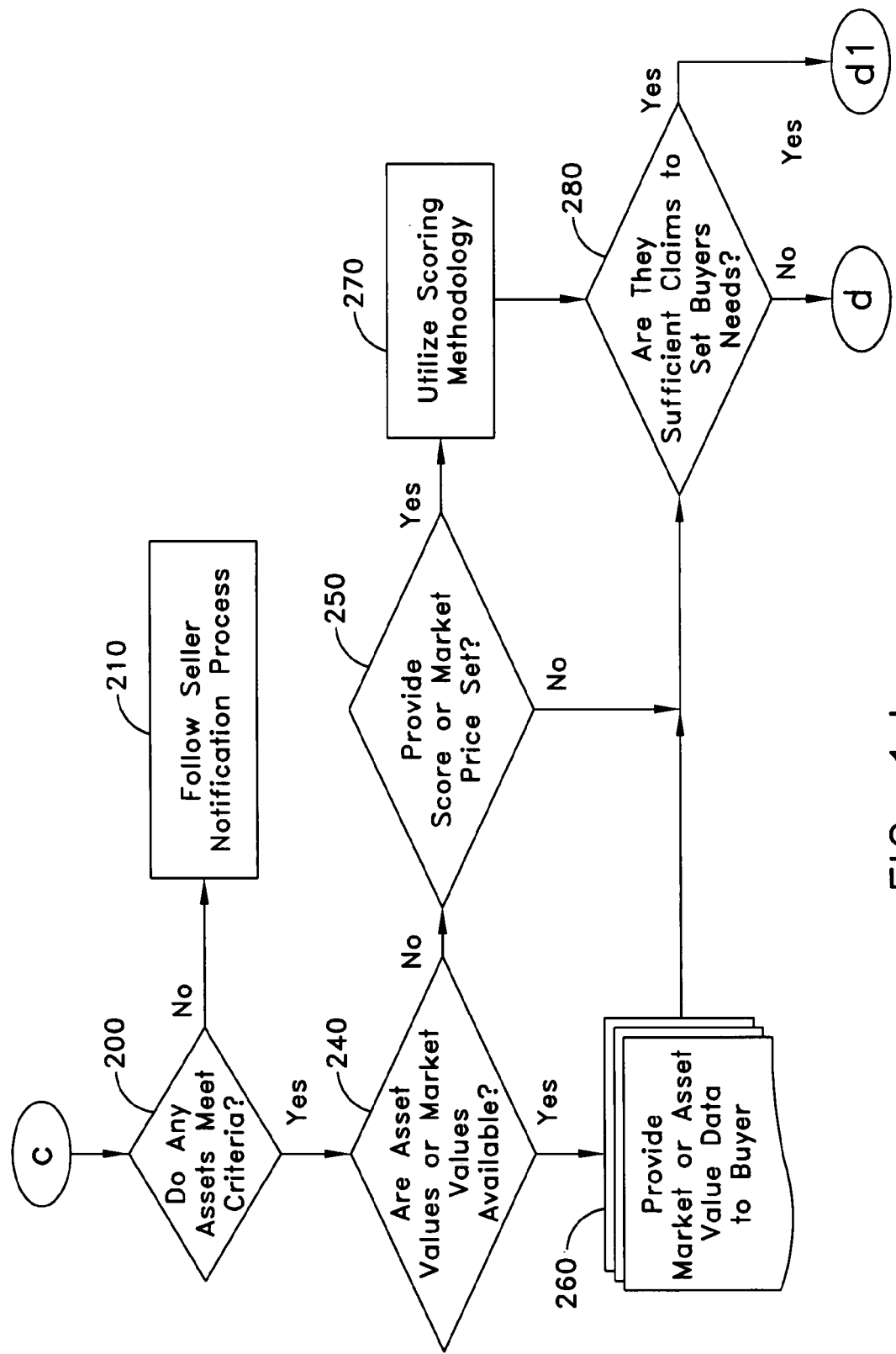

FIG. 1d is representative of a continuation of an exemplary bankruptcy auction process in accordance with the principles of the present invention. In this continuation of the auction process, an inquiry 200 is made regarding whether an asset/potential buyer match has been determined. If the answer is in the negative, then a notification is provided to the seller at block 210 to indicate no buyers have been determined that are interested in the assets. In another aspect of the invention, if a buyer expresses interest in buying a claim or asset but no matching claim or asset is available, the system preferably automatically begins searching for other claims from other sellers based on historical behavior or preferences of the buyer.

However, if one or more assets/buyers have been determined to exist, a determination is made, at block 240, whether a market value for the assets is available. If a market value is available then this value is provided to the potential buyers that have been matched to the assets, at block 260.

If, however, a market value is not available, then an inquiry 250 is made to determine whether a market value and/or asset score should be determined. If the answer is in the negative, then process continues at block 280.

If, however, the answer is in the affirmative, a market value and/or asset score is determined at block 270. As will be explained in more detail with regard to FIGS. 2 and 3, a market value may be determined using historical value data for same or similar assets. In one aspect of the invention, an average market value may be determined as the average value of same assets previously sold or bidded upon. In another aspect of the invention, an average market value may be determined as a weighted average value of same and similar assets previously sold or bidded upon. In another aspect, a weighted unit asset value may be determined as the average value of a weighed average value. A market value may be determined from a determined weighted unit asset augmented by the number of unit assets available. In still another aspect of the invention, the weighting factors may be predeterminedly set at an equal value and then dynamically adjusted to create a greater weight or influence of one factor over another.

Asset score may be determined using a methodology similar to that disclosed in co-pending U.S. patent application Ser. No. 09/676,391, filed Sep. 29, 2000, entitled "An Improved Method and System for Indemnifying Subrogation Potential and Valuing a Subrogation File," the entire of which is hereby incorporated by reference.

An inquiry 280 is made to determine whether there are sufficient claims or assets available to satisfy the buyers needs.

Although not shown, it would be appreciated that the auction process may then begin wherein each of the potential buyers 60 may place one of more bids for the purchase of the claims or assets subject to the bankruptcy proceedings. The bidding is completed by either the expiration of the duration of the auction process or when no additional bids are received. At the conclusion of the auction process, a reconciliation of the funds due the seller and the owed by the buyer may occur.

FIG. 1e is representative of a continuation of an exemplary bankruptcy auction process in accordance with the principles of the present invention. In this continuation of the illustrative auction process, if there are sufficient assets or claims to meet the buyers needs which are consistent with the buyers established criteria or preferences, then a buyer transaction is initiated at block 290. In one aspect of the invention, a buyer transaction may include a confirmation of acceptance of the highest bid price. In another aspect of the invention, a buyer transaction may include dynamically grouping like-claims from one or more cases of bankruptcy claims or sellers to meet the needs of the buyer. Bids and subsequent sale price are then stored, at block 292, to provide data for subsequent determination of market value for same or similar assets.

If, however, there is an insufficient number of claims or assets that satisfy the buyer's needs, then a determination is made at block 295 whether the available claim or asset volume is greater than the buyer's need. If the determined claim or asset volume is greater than the buyer's needs, then the claims or assets are reviewed at block 297 to determine whether the amount of claims or assets can be divided or apportioned into smaller groups or amounts. If the answer is in the affirmative, then a buyer's transaction is initiated at block 290. Bids and subsequent sale price are then stored at block 292, to provide data for subsequent determination of market value for same or similar assets. If, however, the answer is in the negative then a seller notification process is initiated at block 299. The seller notification process may inform the seller of the buyer's need. The seller may then inject additional claims or assets into the auction process to satisfy the buyer's needs. Bids and subsequent sale price are then stored at block 292 to provide data for subsequent determination of market value for same or similar assets.

If however, the claimed value volume is less than the buyer's needs, then a seller notification process is initiated at block 299. Bids and subsequent sale price are then stored at block 292 to provide data for subsequent determination of market value for same or similar assets.

Figure 2:
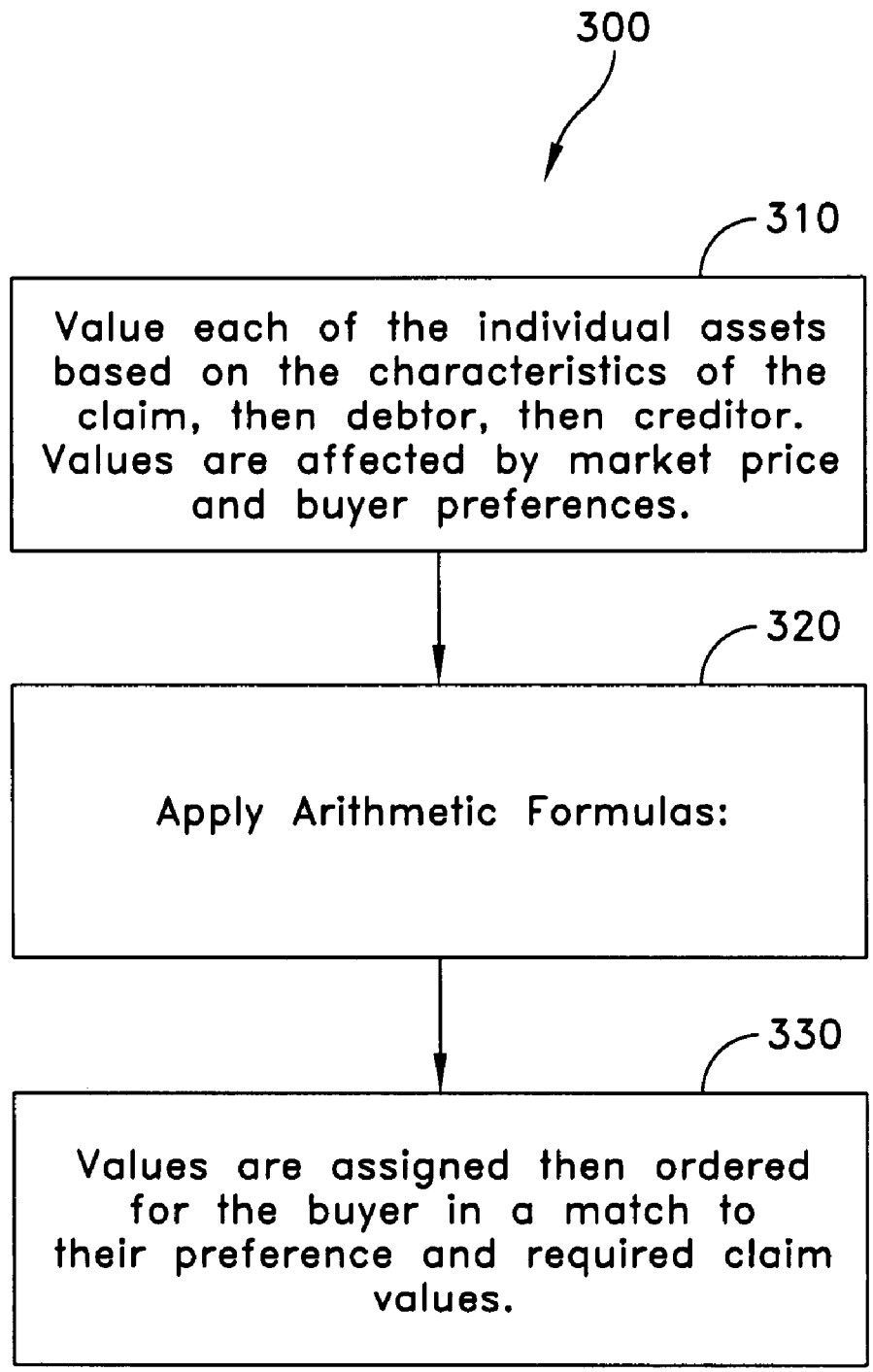
FIG. 2 illustrates a block diagram of an exemplary process for valuing bankruptcy assets in accordance with the principles of the invention.

FIG. 2 illustrates a block diagram 300 for determining a market value/asset score of an asset in accordance with the principles of the invention. In this illustrated example, each asset is valued or characterized based on claim or asset attributes such as claim size, debtor, creditor, etc. at block 310. Asset value or characterization is also affected, or adjusted, by factors such as market price, buyer preference, etc. In one aspect of the invention, a simple average asset value when each previously bidded upon or sold claim or asset is the same the current claim or asset. In another aspect of the invention, a weighted average may be used when previously bidded upon or sold claims or assets are the same as, or similar to, the current claims or assets. A formulation of a market value may further consider factors such as type of industry, asset ratio, asset location, creditor, credit rating, claim value, asset class, disputed or not disputed claim, the nature of the claim and the claim amount, etc. At block 320 an asset score is determined using known arithmetic functions or operations. For example, asset score may be determined by translating an asset or market value, wherein the asset score may be in a range of zero–100. At block 330, determined market values/assets scored are ordered according to buyer preferences and claimed value.

Figure 3:
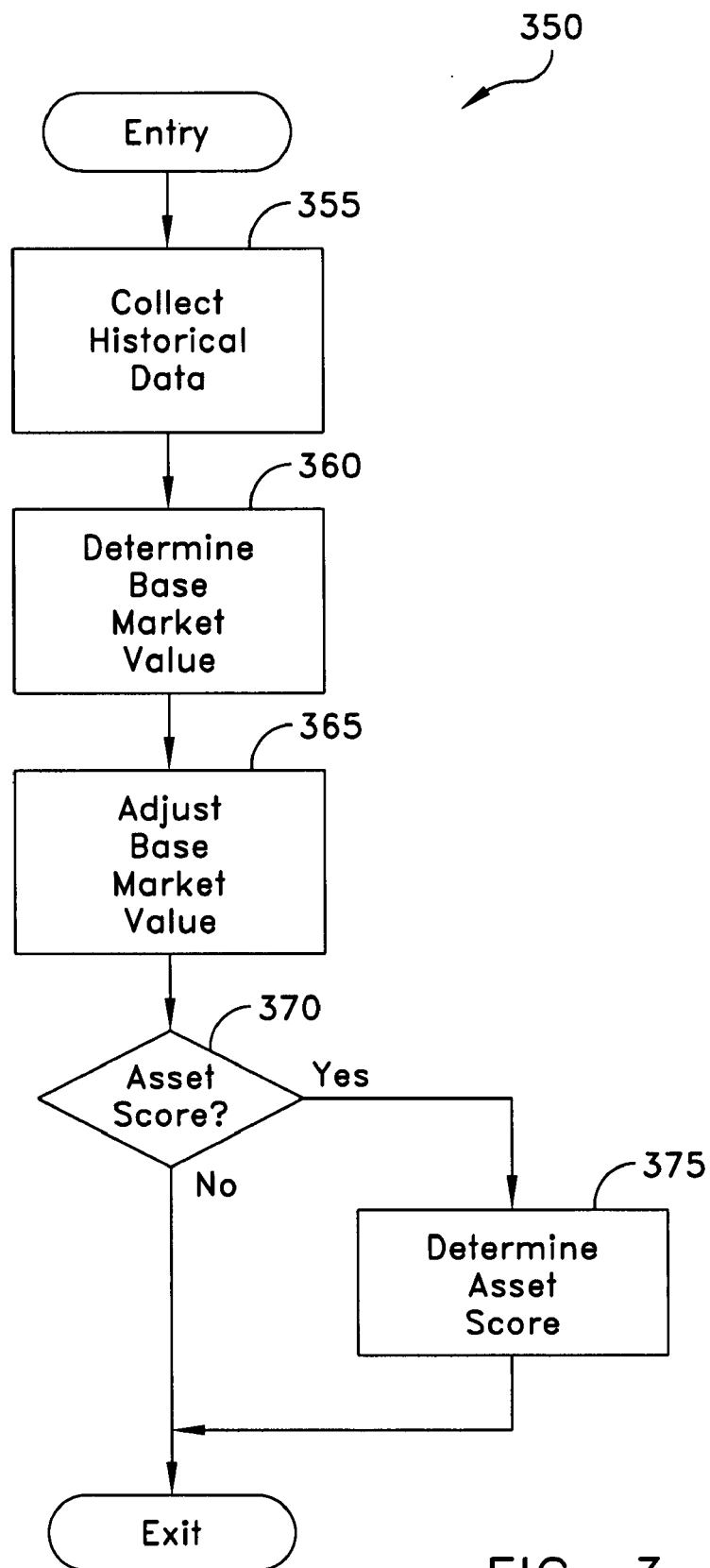
FIG. 3 illustrates a flow chart of an exemplary process for valuing bankruptcy assets in accordance with the principles of the present invention.

FIG. 3 illustrates a flow chart of an exemplary process 350 for determining a market value/asset score of one or more bankruptcy claims or assets. In this exemplary process, historical data regarding previous sales, offers, bids and/or distributions of the same or similar claims or assets to those claims or assets currently in bankruptcy proceedings are collected at block 355. Similar assets may be selected based on the type of asset, general category of asset, etc. For example, if the claim or asset in bankruptcy were one or more cars, then type of assets may be selected from cars having similar characteristics, such as model and year, engine size, price range, etc. Further, the type of asset may be selected from similar American, European or Japanese cars having similar characteristics. General category of asset may include selection of cars, sport utility vehicles, trucks etc., which are included within a similar range of price, model year or mileage. As would be appreciated, a similar type or category of asset may be determined for each bankrupt asset.

At block 360, a determination is made regarding a suggested base market value of the bankrupt claim or asset. In one aspect of the invention, a base market value may be determined by formulating an average value of historical sales, and/or offers and/or distributions of the same asset. In another aspect of the invention, a base market value may be determined by formulating a weighted average value of historical sales, and/or offers and/or distributions of the same and similar assets. In this aspect of the invention historical sales, offers or distributions of a same asset is weighted more than historical sales, offers or distributions of similar types or categories of assets. Returning to the example of the bankrupt asset being one or more cars, historical sales of the same make and model car may be weighted more or provided greater influence than historical sales of makes and models from the same manufacturer, which is weighted more or provided greater influence than historical sales of similar or comparable makes and models of different manufacturers, etc. Weighted averages are well known in the art.

At block 365, an adjustment to the determined market value is determined based, for example, on the type goods, the location of the goods, the duration of the bankruptcy sale, announcements regarding the bankruptee, the court or competitors, the seller's need, the buyer's credit etc. An adjustment may decrease the determined market value of seasonal goods, such as clothing being sold outside the season of their use. Similarly, a market value of goods located in a region that is not suited for their use, e.g., snowblowers in Florida, may also be reduced. Decreases in the market value may similarly occur for perishable goods that are on sale for a period substantially similar to their expiration date. Announcements by the U.S. Bankruptcy Court, for example, in forcing a sale may further reduce the determined market value. Similarly, an announcement by a competitor or a similar business entity regarding earnings, market forces, etc., may present the potential of similar assets being made available and consequentially affecting the determined market value. As would be appreciated, positive adjustment to a determined market value may also be determined.

At block 370 a determination is made whether an asset score is to be determined. If the answer is in the affirmative, than an asset score is determined at block 375. As previously discussed an asset score may be determined using a methodology similar to that disclosed in co-pending U.S. patent application Ser. No. 09/676,391.

Figure 4:
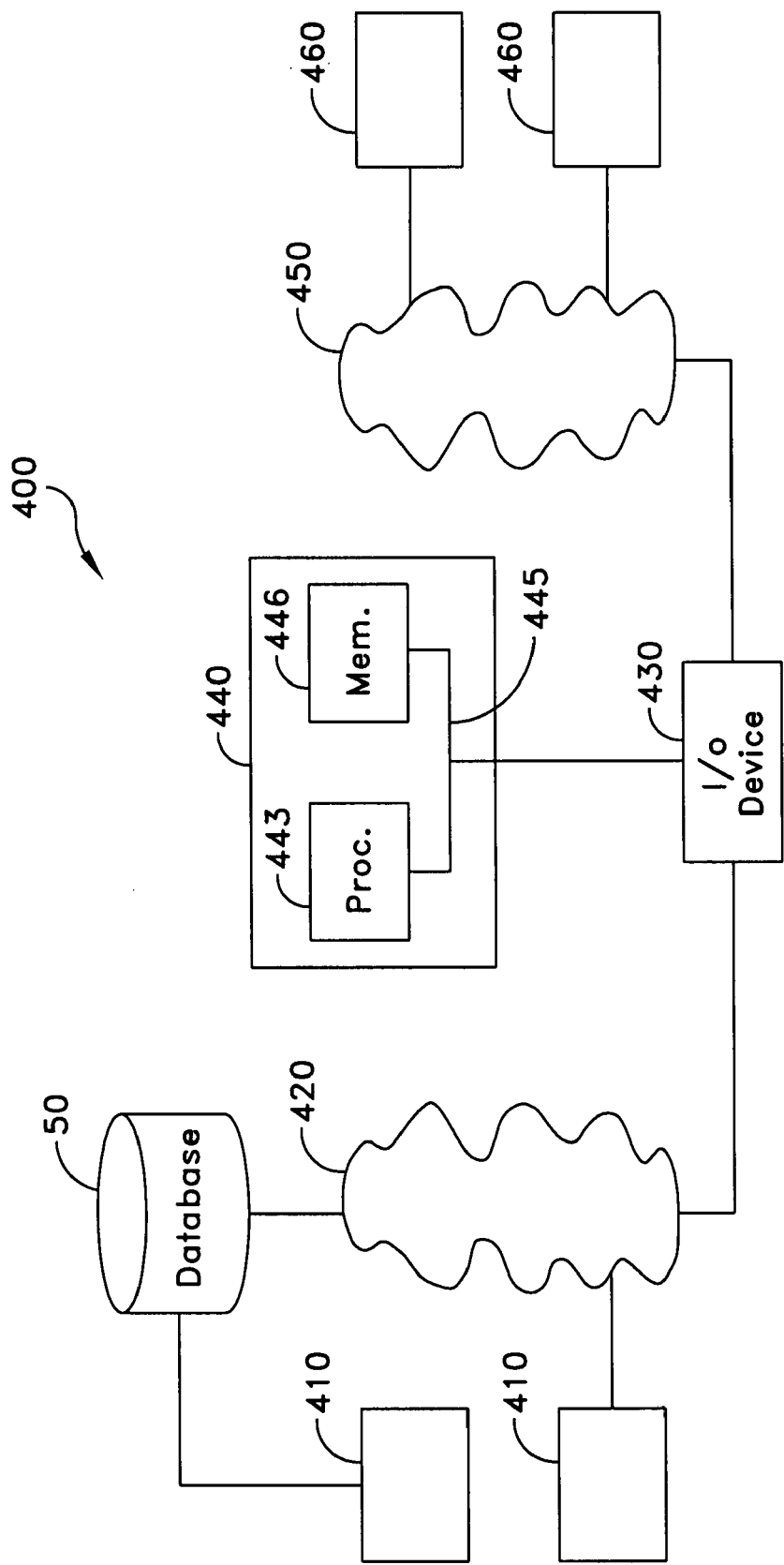
FIG. 4 illustrates an exemplary system for valuing and auctioning bankruptcy assets in accordance with the principles of the invention.

FIG. 4 illustrates an exemplary embodiment of a system 400 that may be used for implementing the principles of the present invention. System 400 includes one or more sources 410, one or more input/output devices 443, a processor 446 and a memory 404. Source(s) 410 may represent communication devices, such as computers, laptops, modems, servers, telephones, facsimile machines, photocopiers, etc., that have access to bankruptcy court filings or claim administrator filings, which may be stored on databases 59 (40). Source(s) 410 may alternatively be in communication with one or more network connections for receiving data from a server or servers over network 420, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Input/output devices 430 may be in communication with network 420 or may be in direct communication with input source 410. I/O devices 430 provide means for entering data into, and transmitting data from, processor 443 and memory 446. Data received by I/O devices 430 may be immediately accessible by processor 443 or may be stored in memory 446. As will be appreciated, I/O device 430 may also allow for manual input, such as a keyboard or keypad entry or may read data from magnetic or optical medium (not shown).

I/O devices 430, processors 443 and memory 446 may be in direct communication or in communication over medium 445, as shown. Communication medium 445 may represent, for example, a bus, a communication network, one or more internal connections of a circuit, circuit card or other device, as well as portions and combinations of these and other communication media.

Data from the source(s) 410 received by I/O devices 430 is processed in accordance with one or more software programs operable to perform the functions illustrated in FIGS. 2 and 3, which are stored in memory 446 and executed by processor 443. The output of processor 443 may then be transmitted over network 450 to output devices 460.

In a preferred embodiment, the coding and decoding employing the principles of the present invention may be implemented by computer readable code executed by processor 443. The code may be stored in the memory 446 or read/downloaded from a memory medium such as a CD-ROM or floppy disk (not shown). In other embodiments, hardware circuitry may be used in place of, or in combination with, software instructions to implement the invention. For example, the elements illustrated herein may also be implemented as discrete hardware elements. As would be appreciated, processor 443 may be means, such as general purpose or special purpose computing system, or may be a hardware configuration, such as a dedicated logic circuit, integrated circuit, Programmable Array Logic (PAL), Application Specific Integrated Circuit (ASIC), that provides known outputs in response to known inputs.

According to a preferred embodiment of the present invention, only registered clients or members are permitted to submit a bid related to one or assets in bankruptcy, after being notified of the availability of the asset. To bid, a member may access or view a centralized area at a remote location, such as an Internet webpage that contains one or more assets that are available for sale or auction and which the buyer has expressed an interest. The potential buyer may also review information regarding the asset or assets available. The member may then click on an indicator, e.g., a "Bid" box, to enter an amount. The member may then be prompted to enter a user name and password and then be instructed to click on a second indicator, e.g., a "Submit" button. A bidding member or user should be sure to have read the item description thoroughly before placing a bid as it is a contract to buy the item that in a preferred embodiment cannot be revoked.

Auctions, and/or claims or assets within an auction, may be identified using an asset listing ID number. This identification can also be advantageously used to match due diligence materials with the correct asset.

According to one form of the present invention, there are three possible outcomes of an auction: 1) the asset is sold to the highest bidder, 2) the asset is not sold because no bids were placed, or 3) bidding did not meet the seller's reserve price or minimum acceptable bid. The seller may consider completing the sale by accepting the highest bid. In either case, the bids and/or sale prices are stored for subsequent determination of same or similar assets.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A computer method of auctioning at least one claim or asset in bankruptcy over a communication network, said method comprising the steps of:
identifying potential buyers for said at least one claim or asset using at least one of a plurality of factors, the factors comprising previous purchasing behavior, industry links, and market research;
notifying selected ones of the potential buyers of the availability of said at least one claim or asset;
determining a market value of said at least one claim or asset using historical data of same or similar claims or assets, said determining comprising: accessing historical data of sales of claims or assets previously recorded, determining a claim or asset unit value based on said historical data, and formulating said market value based on said claim or asset unit value and number of said claims or assets available;
dynamically adjusting said market value based on known factors;
registering ones of said buyers who have expressed an interest in bidding on said at least one claim or asset;
obtaining bids from said registered buyers over said network; and
accepting a highest one of said bids if said highest one of said bids satisfies a predetermined criteria and notifying said registered buyer from which said highest one of said bids was obtained of the acceptance thereof; or
rejecting said bids if said bids do not satisfy said predetermined criteria.

2. The method of claim 1, wherein said claim or asset unit value is determined as a weighted average.

3. The method of claim 2, wherein weights are determined in accordance with factors selected from the group consisting of: number of assets, duration of sale, or date of sale.

4. The method of claim 1, wherein the step of notifying comprises using, for each of said potential buyers, a notification method which has been predetermined for that potential buyer.

5. The method of claim 4, wherein said notification method is selected from the group consisting of e-mail, regular mail, phone calls, express mail, courier mail, and courier.

6. The method of claim 1, wherein the step of dynamically adjusting said market value comprises:
determining an adjustment value as a function of known adjustment factors; and
applying said adjustment value to said market value.

7. The method of claim 6, wherein said function is selected from the group consisting of average, weighted average, medium, and median.

8. The method of claim 6, wherein said known adjustment factors are selected from the group consisting of: industry type, bankrupt debtor debt to asset ratio, asset location, creditor, creditor credit rating, claim value, asset class, dispute status of claim, claim amount, and perishability of asset.

9. The method of claim 1, further comprising recording each received bid.

10. The method of claim 1, wherein said predetermined criteria comprise a highest value.

11. The method of claim 1, wherein the bid accepting step further comprises recording said accepted bid.

12. The method of claim 1, further comprising notifying a seller of said at least one claim or asset that none of said bids satisfy said predetermined criteria.

13. The method of claim 1, further comprising indicating the availability of said at least one claim or asset at a remote site on said network.

14. The method of claim 13, wherein indicating availability of said at least one claim or asset comprises: providing a claim or asset identifier on said remote site on said network, said claim or asset identifier identifying a quantity and characteristics of said at least one claim or asset.

15. The method of claim 1, further comprising matching each of the potential buyers against select marketing criteria after the identifying and before the notifying, wherein the selected ones of the potential buyers are the potential buyers matching the marketing criteria.

16. A computer system for auctioning at least one claim or asset in bankruptcy over a communication network, said system comprising:

a memory comprising:

code for identifying potential buyers for said at least one claim or asset using at least one of a plurality of factors, the factors comprising previous purchasing behavior, industry links, and market research;

code for notifying selected ones of the potential buyers of the availability of said at least one claim or asset;

code for determining a market value of said at least one claim or asset using historical data of same or similar claims or assets, said determining comprising: accessing historical data of sales of claims or assets previously recorded, determining a claim or asset unit value based on said historical data, and formulating said market value based on said claim or asset unit value and number of said claims or assets available;

code for dynamically adjusting said market value based on known factors;

code for registering ones of said buyers who have expressed an interest in bidding on said at least one claim or asset;

code for obtaining bids from said registered buyers over said network; and code for accepting a highest one of said bids if said highest one of said bids satisfies a predetermined criteria and notifying said registered buyer from which said highest one of said bids was obtained of the acceptance thereof; or code for rejecting said bids if said bids do not satisfy said predetermined criteria;

a processor in communication with said memory operable to execute said codes within said memory.

17. The system of claim 16, further comprising at least one input/output device interposed between said communication network and said processor to provide information items from said network to said processor and from said processor to said network.

18. The system of claim 17, wherein said network is selected from the group consisting of: the Internet, an intranet, LAN, WAN, POTS and PSX.

19. The system of claim 16, wherein the memory further comprises code for matching each of the potential buyers against select marketing criteria, wherein the selected ones of the potential buyers match the marketing criteria.

* * * * *